US008145736B1

(12) United States Patent
Tewari et al.

(10) Patent No.: US 8,145,736 B1
(45) Date of Patent: Mar. 27, 2012

(54) FAST DISTRIBUTED OBJECT LOOKUP FOR A COMPUTER NETWORK

(75) Inventors: Ruchir Tewari, Sunnyvale, CA (US); Kai Wong, Saratoga, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1706 days.

(21) Appl. No.: 10/610,064

(22) Filed: Jun. 30, 2003

(51) Int. Cl.
*G06F 15/173* (2006.01)
(52) U.S. Cl. ......... 709/223; 709/229; 370/266; 710/100
(58) Field of Classification Search ................. 709/223, 709/229; 370/266; 710/100
See application file for complete search history.

(56) References Cited

U.S. PATENT DOCUMENTS

| | | | |
|---|---|---|---|
| 5,550,986 A * | 8/1996 | DuLac .......................... | 710/100 |
| 5,689,706 A | 11/1997 | Rao et al. | |
| 5,701,462 A | 12/1997 | Whitney et al. | |
| 6,108,703 A | 8/2000 | Leighton et al. | |
| 6,173,293 B1 | 1/2001 | Thekkath et al. | |
| 6,625,604 B2 | 9/2003 | Muntz et al. | |
| 6,748,381 B1 | 6/2004 | Chao et al. | |
| 6,782,389 B1 | 8/2004 | Chrin et al. | |
| 6,839,769 B2 | 1/2005 | Needham et al. | |
| 2002/0065919 A1 | 5/2002 | Taylor et al. | |
| 2002/0114341 A1 | 8/2002 | Sutherland et al. | |
| 2002/0138471 A1* | 9/2002 | Dutta et al. ........................ | 707/3 |
| 2002/0147815 A1 | 10/2002 | Tormasov et al. | |
| 2002/0184311 A1 | 12/2002 | Traversat et al. | |
| 2003/0156552 A1* | 8/2003 | Banker et al. .................. | 370/266 |

OTHER PUBLICATIONS

A. Rowstron and P. Druschel. "Pastry: Scalable, distributed object location and routing for laige-scale peer-to-peer systems." In Proc. *IFIP/ACM Middleware 2001*, Heidelberg, Germany, Nov. 2001.
Zhao, et al "Tapestry: An Infrastructure for Fault-tolerant Wide-area Location and Routing" *UCB Tech. Report UCB/CSD-01-1141*. Apr. 2001.
Stoica, et al "Chord: A Scalable Peer-to-peer Lookup Service for Internet Applications," *ACM SIGCOMM 2001*, San Diego, CA, Aug. 2001, pp. 149-160.
Manku, et al, "Symphony: Distributed Hashing in a Small World" Published in USITS, 2003.
Kubiatowicz, et al "OceanStore: An Architecture for Global-scale Persistent Storage" *Proceedings of ACM ASPLOS*, Nov. 2000.
Adya, et al; "FARSITE: Federated, Available, and Reliable Storage for an Incompletely Trusted Environment"; *Proceedings of the 5TH OSDI*, Dec. 2002.
Garces-Erice, et al; "Hierarchical Peer-to-Peer Systems," In the Special issue of the *Parallel Processing Letters* (PPL), Dec. 2003, vol. 13, No. 4.

(Continued)

*Primary Examiner* — Adnan Mirza
(74) *Attorney, Agent, or Firm* — Wilmer Cutler Pickering Hale and Dorr LLP

(57) ABSTRACT

A system and method related for performing lookup operations for objects distributed among different nodes in a peer-to-peer network are disclosed. Various nodes in the peer-to-peer network may store objects. Objects stored on a given node may be accessed by other nodes in the peer-to-peer network. To access an object, a node may first perform a lookup operation to determine where the object is stored, i.e., to determine which node in the peer-to-peer network stores the object. The peer-to-peer network may utilize a method to improve the performance of object lookup operations. In one embodiment, the method may allow object lookup operations to be performed with a latency on the order of one hop.

19 Claims, 6 Drawing Sheets

OTHER PUBLICATIONS

Gummadi, et al; "A Case for Hierarchical Distributed Hash Tables," University of Washington, date unknown.

"Lustre Whitepaper Version 1.0" Cluster File Systems, Inc., Nov. 11, 2002.

* cited by examiner

FAST DISTRIBUTED OBJECT LOOKUP FOR A COMPUTER NETWORK

BACKGROUND OF THE INVENTION

1. Field of the Invention

This invention relates to computer networks and, more particularly, to a method for improving the performance of lookup operations for objects distributed among different computer systems in a computer network.

2. Description of the Related Art

Peer-to-peer networking has seen rapid growth in recent years. A peer-to-peer or P2P network is generally used to describe a decentralized network of peer computing nodes, where each node may have similar capabilities and/or responsibilities. A pure peer-to-peer network may not utilize centralized servers. Instead, a given peer node may be equally capable of serving as either a client or a server for other peer nodes. Thus, participating peer nodes in the peer-to-peer network may communicate directly with each other. Work may be done and information may be shared through interaction among the peers.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed data storage, distributed processing, etc.

Nodes in a peer-to-peer network often need to access files or other information stored on other nodes in the peer-to-peer network. To access a particular file or particular information, a node may first need to determine which node the file or information is stored on in the peer-to-peer network. Determining which node the file or information is stored on is referred to herein as a lookup operation. Peer-to-peer systems capable of performing lookup operations have been developed, including PASTRY, CHORD, TAPESTRY, and SYMPHONY. In existing peer-to-peer networks, a lookup operation is typically performed by the node needing to access the file sending a query to one or more other nodes to determine the file's location. The query may be propagated on to other nodes in the network until reaching a node that knows where the file is located. Information specifying the file location may then be propagated back from this node to the node that originally issued the query.

This technique of performing a lookup operation takes multiple hops. In a peer-to-peer network having N nodes, the average latency for such a lookup operation is on the order of log(N). In comparison with centralized networking schemes, this is a very high latency operation and limits the performance of the system. Thus, it would be desirable to provide a technique for improving the performance of lookup operations for a peer-to-peer network.

SUMMARY

Various embodiments of a system and method related to performing lookup operations for objects distributed among different nodes in a peer-to-peer network are disclosed. A plurality of nodes may be coupled to each other to form the peer-to-peer network. Coupling the plurality of nodes to each other may comprise creating a plurality of links. Each link may comprise a virtual communication channel between a first node and a second node.

Various nodes in the peer-to-peer network may store objects. As used herein, an "object" may comprise a portion of data, such as a file or other type of data entity. Objects stored on a given node may be accessed by other nodes in the peer-to-peer network. To access an object, a node may first perform a lookup operation to determine where the object is stored, i.e., to determine which node in the peer-to-peer network stores the object. The peer-to-peer network may utilize a method to improve the performance of object lookup operations.

According to one embodiment of the method, object location information may be stored on a plurality of nodes in the peer-to-peer network. In one embodiment, a mapping between objects and nodes may be utilized to determine which node should store the object location information for each object. Object location information for each object may be stored on the node that is specified by the mapping. In various embodiments, any kind of mapping between objects and nodes may be utilized. The mapping may also be utilized to determine where the location information for an object is stored when a first node needs to access the object.

BRIEF DESCRIPTION OF THE DRAWINGS

A better understanding of the invention can be obtained when the following detailed description is considered in conjunction with the following drawings, in which.

Figure 1:
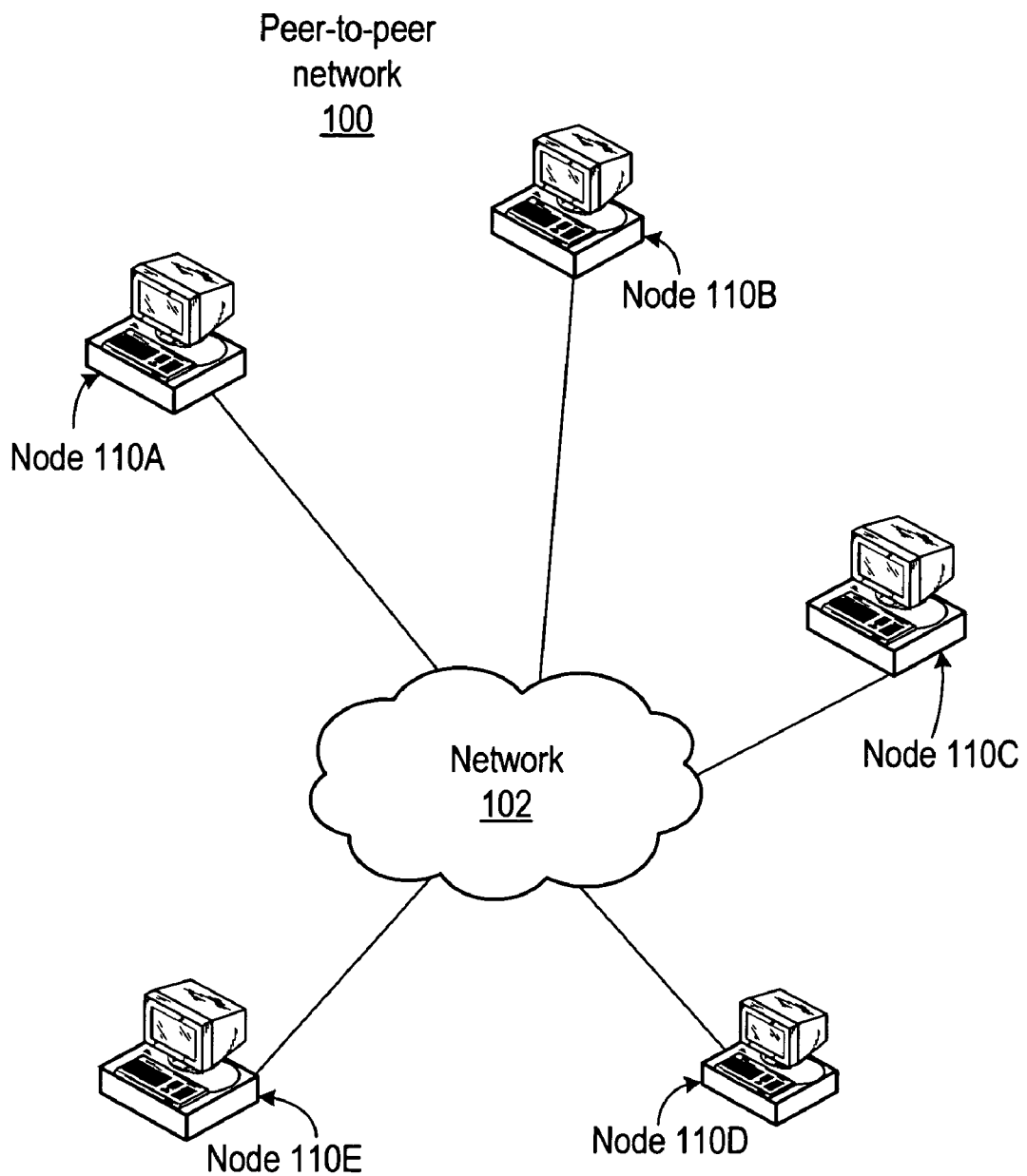
FIG. 1 illustrates a diagram of one embodiment of a peer-to-peer network.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates a diagram of one embodiment of a peer-to-peer network 100. The peer-to-peer network 100 includes computing nodes (e.g., computer systems) 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Example local area networks include Ethernet networks and Token Ring networks. Also, each node 110 may be coupled to the network 102 using any type of wired or wireless connection mediums. For example, wired mediums may include: a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

The peer-to-peer network 100 may comprise a decentralized network of nodes 110 where each node may have similar capabilities and/or responsibilities. As described below, each node 110 may communicate directly with at least a subset of the other nodes 110. Messages may be propagated through the network 100 in a decentralized manner.

Figure 2:
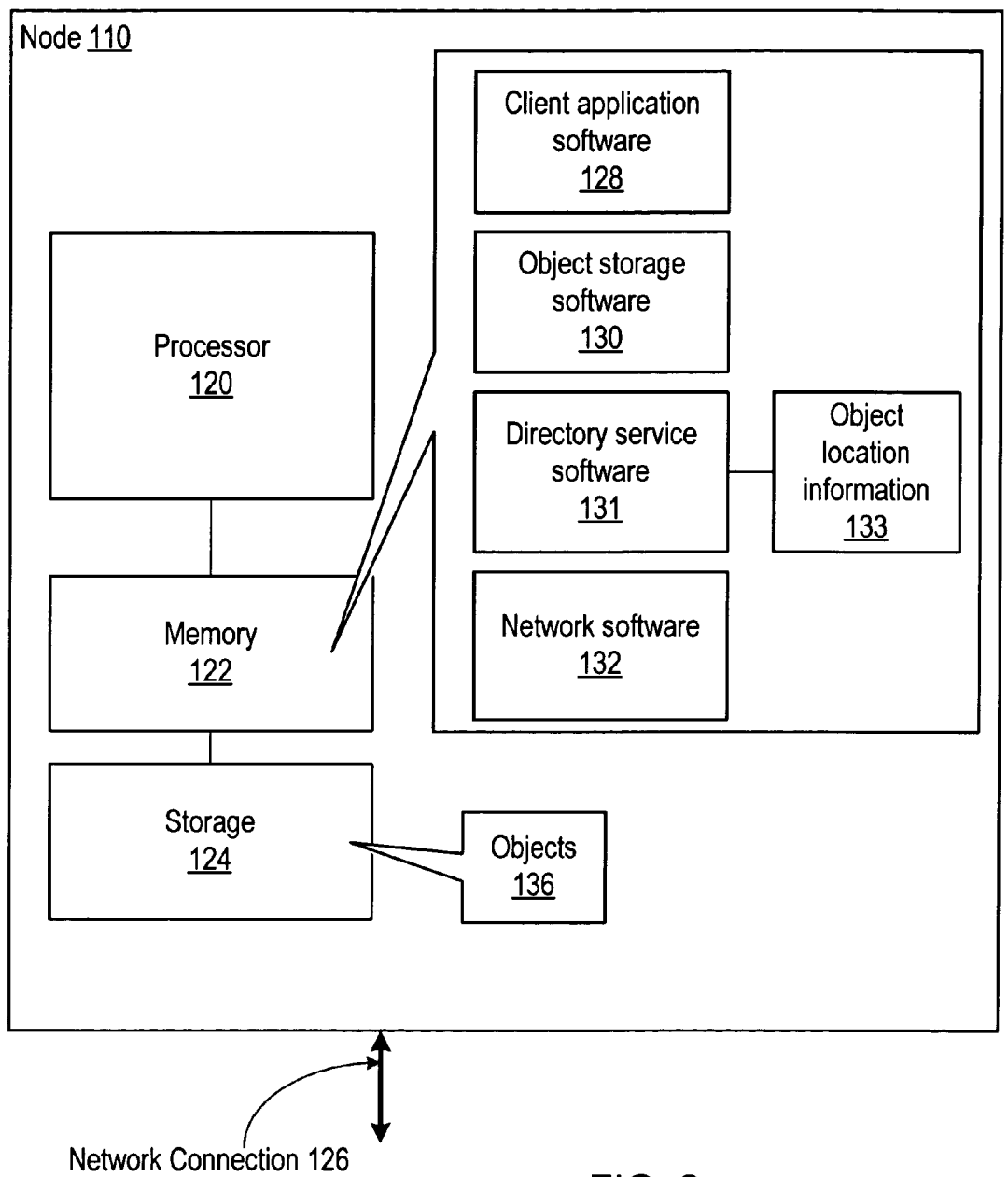
FIG. 2 illustrates one embodiment of a node in the peer-to-peer network.

Referring now to FIG. 2, a diagram of one embodiment of a node 110 in the peer-to-peer network 100 is illustrated. Generally speaking, node 110 may include any of various hardware and software components. In the illustrated embodiment, node 110 includes a processor 120 coupled to a memory 122, which is in turn coupled to a storage 124. Node 110 may also include a network connection 126 through which the node 110 couples to the network 102.

The processor 120 may be configured to execute instructions and to operate on data stored within memory 122. In one embodiment, processor 120 may operate in conjunction with memory 122 in a paged mode, such that frequently used pages of memory may be paged in and out of memory 122 from storage 124 according to conventional techniques. It is noted that processor 120 is representative of any type of processor. For example, in one embodiment, processor 120 may be compatible with the x86 architecture, while in another embodiment processor 120 may be compatible with the SPARC™ family of processors.

Memory 122 may be configured to store instructions and/or data. In one embodiment, memory 122 may include one or more forms of random access memory (RAM) such as dynamic RAM (DRAM) or synchronous DRAM (SDRAM). However, in other embodiments, memory 122 may include any other type of memory instead or in addition.

Storage 124 may be configured to store instructions and/or data, e.g., may be configured to persistently store instructions and/or data. In one embodiment, storage 124 may include non-volatile memory, such as magnetic media, e.g., one or more hard drives, or optical storage. In one embodiment, storage 124 may include a mass storage device or system. For example, in one embodiment, storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 124 may include tape drives, optical storage devices or RAM disks, for example.

As shown in FIG. 2, storage 124 may store a plurality of objects 136. As used herein, an "object" may comprise a portion of data. In various embodiments, an object may include data or information of any kind, and the data or information may be structured or stored in any of various ways. In one embodiment, each object may comprise a file. In other embodiments, objects may comprise program modules or components, data portions stored in a database, or various other types of data entities.

The objects 136 may be accessed by various nodes 110 in the peer-to-peer network 100. To access an object, a node 110 may first perform a lookup operation to determine where the object is stored, i.e., to determine which node 110 in the peer-to-peer network 100 stores the object on its respective storage 124. The peer-to-peer network 100 may utilize a technique to improve the performance of object lookup operations. In one embodiment, the technique may allow object lookup operations to be performed with a latency on the order of 1 hop. In one embodiment, memory 122 of each node 110 may store object storage software 130 and directory service software 131 that are involved with performing object lookup operations, as described in detail below. In one embodiment, memory 122 may also store client application software 128. For example, the client application software 128 may utilize the objects 136, and object lookup operations may be performed when the client application software 128 needs to access objects 136.

Referring again to FIG. 2, network connection 126 may include any type of hardware for coupling the node 110 to the network 102, e.g., depending on the type of node 110 and type of network 102. As shown in FIG. 2, memory 122 may also store network software 132. The network software 132 may include software that is executable by processor 120 to interact with or control the network connection 126, e.g., to send and receive messages or data via the network connection 126.

Figure 3:
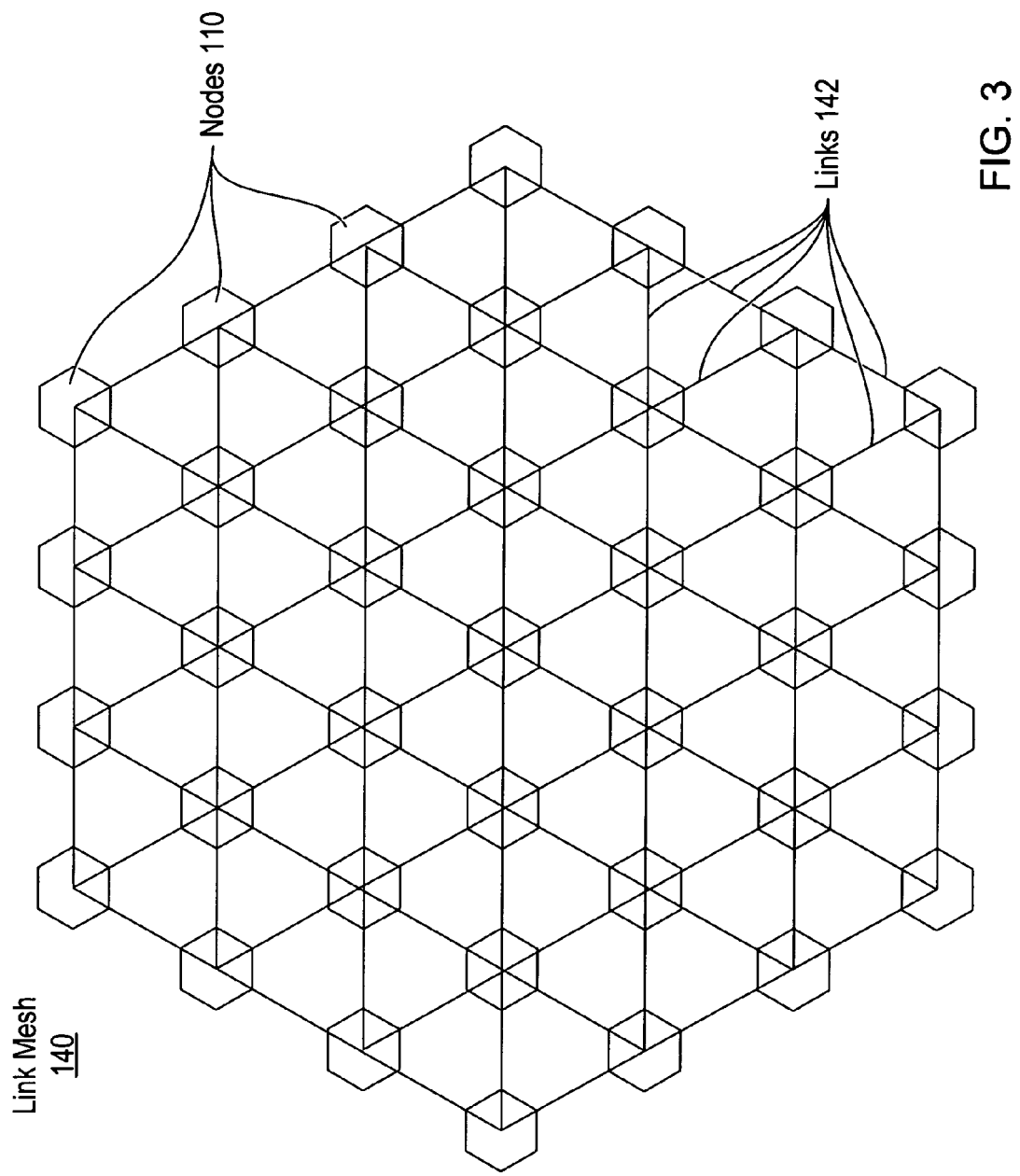
FIG. 3 illustrates an exemplary link mesh for a set of nodes.

In one embodiment, as each node 110 joins the peer-to-peer network 100, the node may establish links 142 with at least a subset of other nodes 110 in the network 100. As used herein, a link 142 comprises a virtual communication channel or connection between two nodes 110. The network software 132 may be responsible for performing a node discovery process and creating links with other nodes as a node comes online in the network 100. The resulting set of connected nodes is referred to herein as a link mesh 140. FIG. 3 illustrates an exemplary link mesh 140 for a set of nodes 110. Each hexagon represents a node 110, and each line represents a link 142 between two nodes 110.

Figure 4:
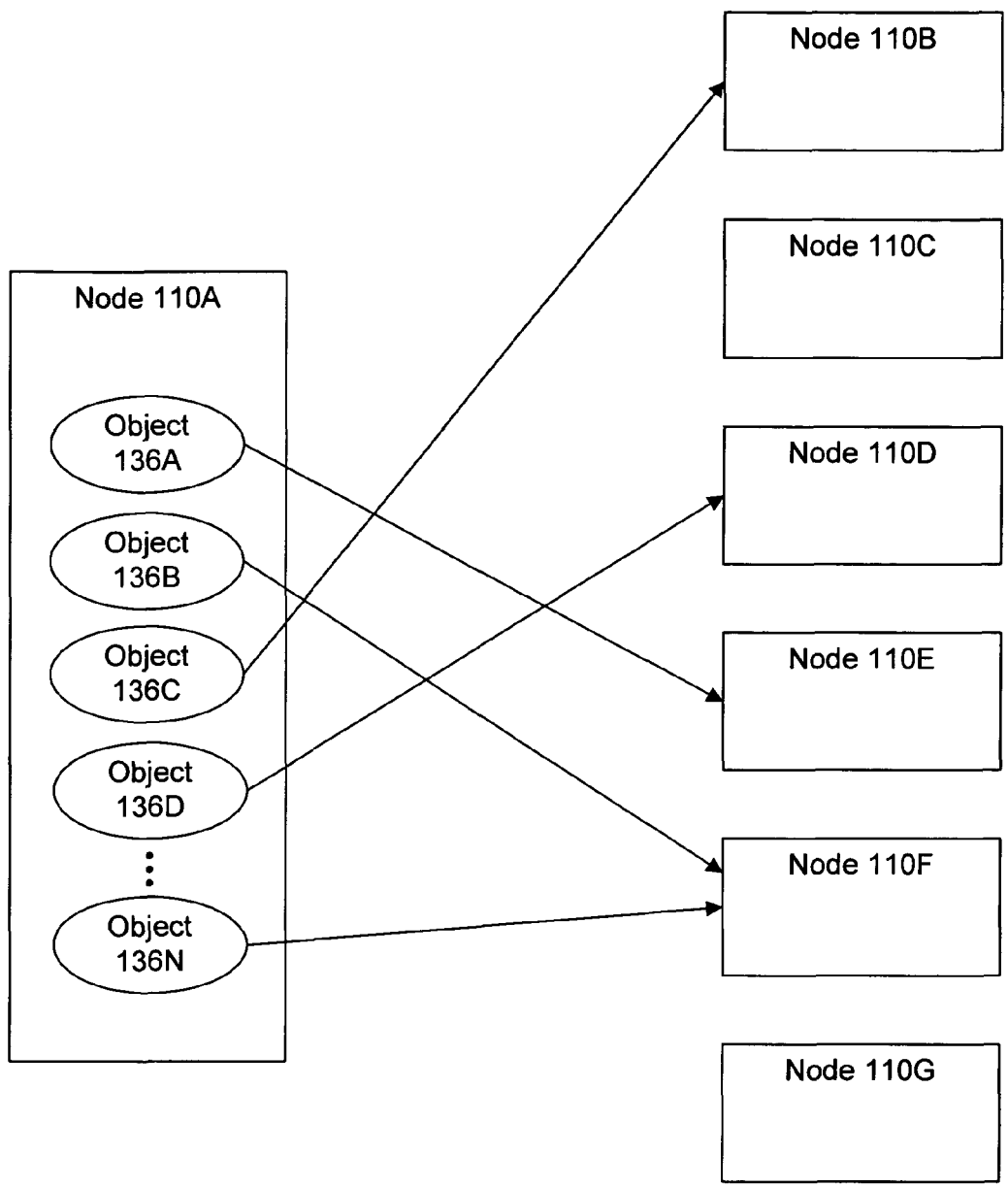
FIG. 4 illustrates an exemplary mapping from objects stored on a node to various other nodes.

FIG. 4—Mapping Between Objects and Nodes

As noted above, the peer-to-peer network 100 may utilize a technique to improve the performance of object lookup operations. This may involve storing object location information 133 on a plurality of nodes 110 in the peer-to-peer network 100. For example, a plurality of nodes 110 in the peer-to-peer network 100 may act as directory servers. Let U represent the entire collection of all objects 136 stored on all nodes 110 in the peer-to-peer network 100. Each node 110 that acts as a directory server may store object location information 133 for a subset of U, i.e., may store object location information 133 for one or more objects 136 selected from the entire collection of all objects 136. For each object 136 for which a given node 110 stores object location information 133, the object 136 may be stored on any node 110 in the peer-to-peer network.

In one embodiment, a mapping between objects 136 and nodes 110 may be utilized to determine which node 110 should store the object location information 133 for each object 136. Object location information 133 for each object 136 may be stored on the node 110 that is specified by the mapping. In various embodiments, any kind of mapping between objects 136 and nodes 110 may be utilized.

FIG. 4 illustrates an exemplary mapping with respect to objects 136 stored on a node 110A, i.e., objects 136 stored on storage 124 of node 110A. As shown, object 136A maps to node 110E. Thus, node 110A may communicate with node 110E to cause object location information 133 for object 136A to be stored on node 110E. More particularly, processor 120 of node 110A may execute object storage software 130 stored in memory 122 of node 110A to cause object location information 133 for object 136A to be stored on node 110E. Processor 120 of node 110E may execute directory service software 131 to create or store the object location information 133 for object 136A on node 110E in response to the communication with node 110A.

Suppose now that node 110C needs to access object 136A. Node 110C may determine that object 136A maps to node 110E, i.e., may determine that node 110E acts as a directory server for object 136A. Thus, node 110C may communicate with node 110E to obtain the object location information 133 for object 136A. More particularly, directory service software 131 executing on node 110C may communicate with directory service software 131 executing on node 110E to obtain the object location information 133 for object 136A. The object location information 133 for object 136A may specify that object 136A is located on node 110A. Node 110C may thus communicate with node 110A to access object 136A. In this example, the latency for the lookup operation to obtain the object location information 133 for object 136A is one hop.

In a similar manner, object 136B on node 110A maps to node 110F, object 136C maps to node 110B, etc. Thus, node 110A may also communicate with these nodes 110 to cause object location information 133 for the respective objects 136 to be stored on the corresponding nodes 110.

Although not illustrated, nodes 110B-110G in this example may also store their own objects 136. The objects 136 stored on nodes 110B-110G may be mapped to various nodes 110 in a similar manner as described above with respect to the objects 136 stored on node 110A. For example, node 110B may store an object 136Y that maps to node 110A. Thus, node 110B may communicate with node 110A to cause object location information 133 for object 136Y to be stored on node 110A.

In various embodiments, various proportions of the nodes 110 in the peer-to-peer network 100 may act as directory servers. In other words, objects 136 stored on various nodes 110 may be mapped to various proportions of the nodes 110. In one embodiment all, substantially all, or a large proportion of the nodes 110 in the peer-to-peer network 100 may act as directory servers. Thus, object lookup requests may be directed to nodes 110 throughout the peer-to-peer network 100. In various applications, this may advantageously reinforce the decentralized nature of the peer-to-peer network 100.

In one embodiment, it may be desirable to map the objects 136 to the nodes 110 that act as directory servers in such a way that the number of objects for which each node acts as a directory server is roughly equal (or is in proportion to the node's computing resources). For example, it may be undesirable for any particular node to act as a directory server for a disproportionately large number of objects because this may cause the node to become overloaded with requests for object location information. In one embodiment, the objects 136 may be mapped to the nodes 110 in a random or pseudo-random manner, which may achieve a roughly even distribution of object location information across the nodes 110.

Figure 5:
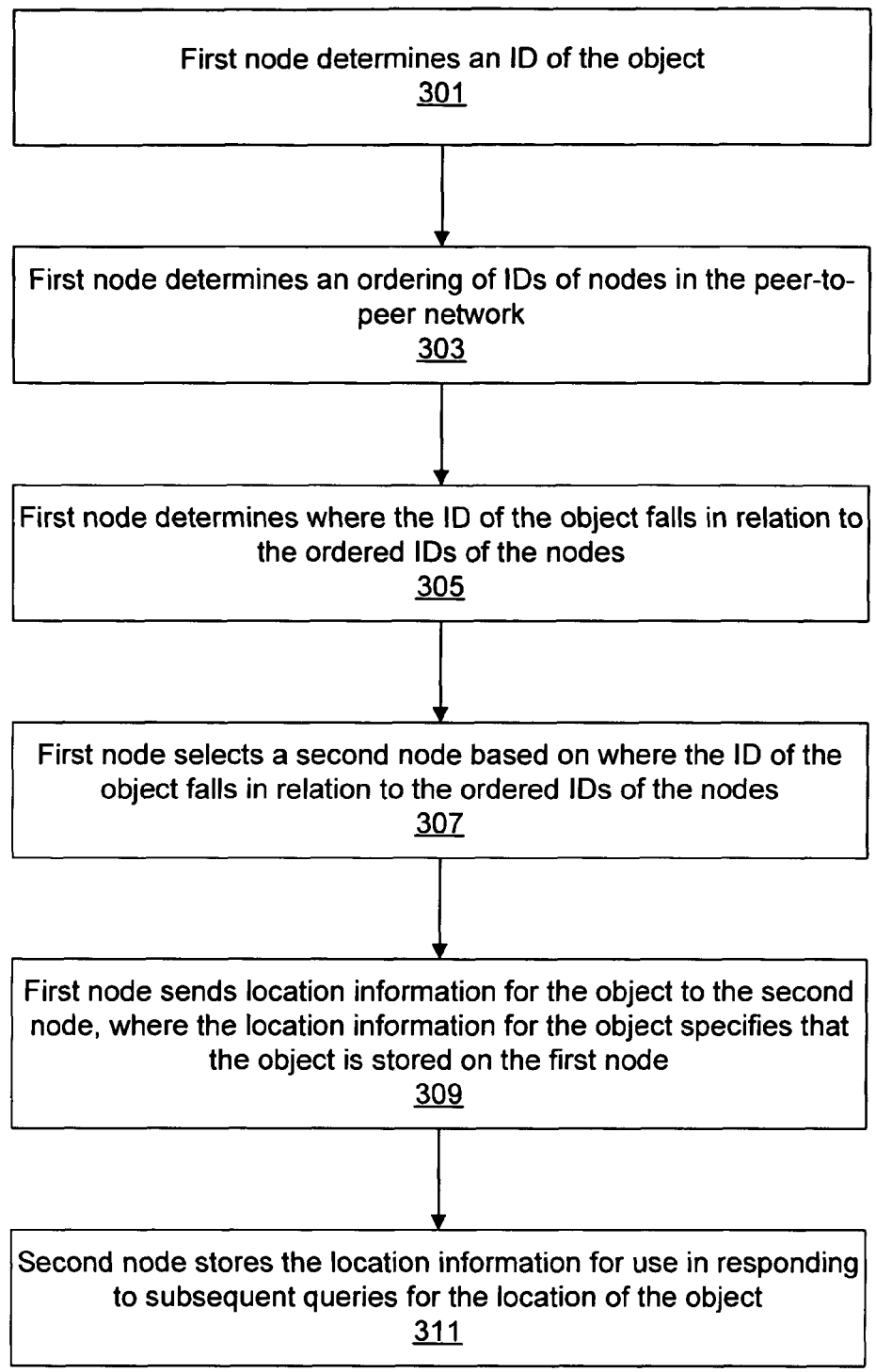
FIG. 5 is a flowchart diagram illustrating one embodiment of a method for storing object location information for a peer-to-peer network.

FIG. 5-*Method* for Storing Object Location Information for a Peer-to-Peer Network As described above, each node that stores objects may communicate with other nodes to cause object location information for the objects to be stored on the respective nodes to which the objects are mapped. FIG. 5 is a flowchart diagram illustrating operations that may be performed according to one embodiment when a first node communicates with a second node to cause object location information for an object to be stored on the second node.

It is noted that FIG. 5 illustrates a representative embodiment, and alternative embodiments are contemplated. In particular, FIG. 5 illustrates an embodiment in which the mapping between objects and nodes is based on IDs of the objects and nodes. In other embodiments, other mapping schemes may be utilized, and the mapping may be based on other information.

In one embodiment, each object 136 and each node 110 may have an associated ID (identifier). The ID of an object or node may include any type of information usable to uniquely identify the object or node. In one embodiment, each object ID or node ID may comprise a sequence of bits, such as a 128-bit Universally Unique ID (UUID). Universally Unique IDs or UUIDs may be allocated based on known art that ensures that the UUIDs are unique. In one embodiment these UUIDs may be generated randomly or pseudo-randomly.

In 301, the first node (e.g., object storage software 130 executing on the first node) may determine the ID of the object, e.g., by examining the object itself or by utilizing stored ID information that specifies the ID of the object based on other information regarding the object, such as a name of the object.

In 303, the first node may determine an ordering of IDs of the nodes that act as directory servers (which may be all or substantially all of the nodes in the peer-to-peer network, as discussed above). The IDs of the nodes may be ordered in any of various ways. In one embodiment, the IDs of the nodes may be placed in increasing order. For example, where the IDs comprise bit sequences, the bit sequences may be compared and placed in increasing numeric order.

In 305, the first node may determine where the ID of the object falls in relation to the ordered IDs of the nodes. In 307, the first node may select a second node to act as a directory server for the object, where the second node is selected based on where the ID of the object falls in relation to the ordered IDs of the nodes. In various embodiments, various techniques may be used to select the second node.

In one embodiment, the second node may be selected such that the ID of the second node is comparatively greater than the ID of the object and such that there is no other node with an ID that is both comparatively greater than the ID of the object and also comparatively less than the ID of the second node. For example, suppose that there are N nodes that act as directory servers, and thus N ordered node IDs. Determining the ordering of the node IDs may comprise determining an ordering such that for each k from 2 to N, the $k^{th}$ node ID is greater than the $(k-1)^{th}$ node ID. Thus, determining where the ID of the object falls in relation to the ordered IDs of the nodes may comprise determining that an $i^{th}$ node ID in the ordering is greater than the ID of the object and determining that the $(i-1)^{th}$ node ID is less than the ID of the object. In this example, the node with the $i^{th}$ node ID may be selected as the second node. (Various techniques may be used to select a second node when boundary conditions occur. For example, if there is no node ID that is greater than the ID of the object, the node with the lowest node ID may be selected as the second node.)

In an alternative embodiment, the second node may be selected such that the ID of the second node is comparatively less than the ID of the object and such that there is no other node with an ID that is both comparatively less than the ID of the object and also comparatively greater than the ID of the second node. In another embodiment, the node with an ID that is comparatively closest to the ID of the object may be chosen as the second node.

In 309, the first node may send location information for the object to the second node. The location information for the object may specify that the object is stored on the first node. For example, the first node may send a message to the second node requesting the second node to store the location information for the object.

In 311, the second node (e.g., directory service software 131 executing on the second node) may receive the location information for the object from the first node and may store the location information for the object. In one embodiment, the location information for the object may be stored in memory 122 of the second node, as illustrated in FIG. 2. Alternatively or in addition, the location information for the object may be stored in storage 124 of the second node. In various embodiments, the location information may be structured or stored in various ways. For example, the location information for the object may be stored in a hash table keyed on the object ID or stored in another data structure that allows fast lookup of object location information. After storing the location information for the object, the second node may be operable to respond to location queries for the object by returning the stored location information which specifies that the object is stored on the first node.

Thus, each node in the peer-to-peer network that stores one or more objects may perform the operations described above with respect to the first node to cause location information for its objects to be stored on various nodes in the peer-to-peer network. If each node in the peer-to-peer network selects a directory server (i.e., selects the second node) according to the mapping technique described above, then the mapping between objects and nodes may be characterized as follows: Let $Node\_ID_i$ represent the ordered node IDs for i=1 to N, where N is the number of nodes that act as directory servers. Thus, $Node\_ID_1 < Node\_ID_2 < \ldots < Node\_ID_N$. For each object with an ID $Object\_ID_j$ such that $Node\_ID_{i-1} < Object\_ID_j < Node\_ID_i$ the object maps to the node having $Node\_ID_i$ as its corresponding directory server (regardless of what node the object is stored on).

As noted above, in one embodiment each object ID and node ID may comprise a Universally Unique ID, which may be generated randomly or pseudo-randomly. This may decrease the possibility of any given node being assigned a disproportionately large amount of object location information.

Various techniques may also be utilized to increase the randomness of the mapping of objects to nodes. For example, in a variation of the mapping described above, each node that acts as a directory server may be assigned a plurality of random and unique node IDs. For example, each node may have one primary or actual node ID and multiple secondary node IDs, e.g., 0 to 1000 secondary node IDs. In this embodiment, 303 may comprise determining an ordering of all IDs (primary and secondary IDs) of the nodes that act as directory servers, e.g., by placing all the node IDs in increasing order.

The second node that acts as a directory server for a given object may then be selected based on where the ID of the object falls in relation to the ordered primary and secondary IDs of the nodes, similarly as described above. For example, if the object ID falls between a first secondary node ID and a second secondary node ID, where the second secondary node ID is greater than the first secondary node ID, then the node having the second secondary node ID may be selected to act as the directory server for the object (or vice versa). Increasing the number of IDs of each node in this manner may help to increase the probability of distributing object location information evenly across the nodes.

In other embodiments, any of various other techniques may be utilized to increase randomness of the mapping of objects to nodes or otherwise achieve a more even distribution of object location information across the nodes.

Figure 6:
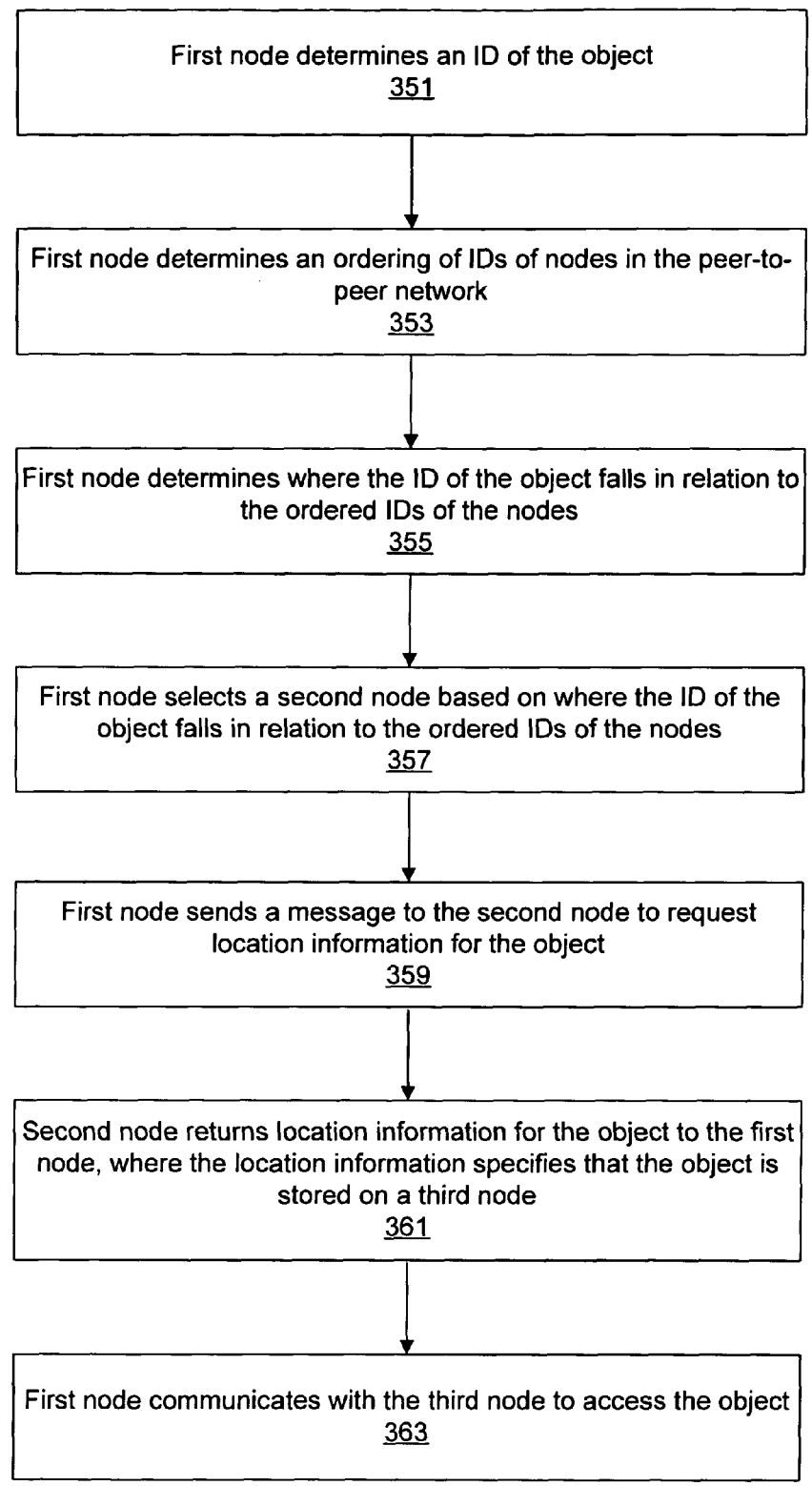
FIG. 6 is a flowchart diagram illustrating one embodiment of a mthod for looking up object location information stored on a peer-to-peer network.

FIG. 6—Method for Looking Up Object Location Information

As described above, each node 110 that needs to access an object 136 may first communicate with a node 110 that acts as a directory server for the object 136 to obtain location information 133 for the object 136. FIG. 6 is a flowchart diagram illustrating operations that may be performed according to one embodiment when a first node communicates with a second node to request location information for an object and communicates with a third node to access the object.

It is noted that FIG. 6 illustrates a representative embodiment, and alternative embodiments are contemplated. In particular, FIG. 6 illustrates an embodiment in which the mapping between objects and nodes is based on IDs of the objects and nodes. In other embodiments, other mapping schemes may be utilized, and the mapping may be based on other information.

In 351, the first node (e.g., directory service software 131 executing on the first node) may determine an ID of the object that the first node needs to access. In various embodiments, the ID of the object may be determined in various ways. In one embodiment, the need to access the object may originate from client application software 128 executing on the first node, and the client application software 128 may inform the directory service software 131 of the object ID. In another embodiment, the ID of the object may be determined based on other information regarding the object, such as a name of the object. For example, in one embodiment each object may comprise a file. A file system of each node may maintain information specifying an ID of each file, regardless of where the file is located in the peer-to-peer network. Thus, the directory service software 131 of the first node may interface with the file system of the first node to obtain the ID of the desired file, e.g., by specifying a name and/or other attributes of the file.

When accessing the object, the directory server for the object may be determined in the same way as when the location information for the object is stored. Thus, in 353, the first node may determine an ordering of IDs of nodes in the peer-to-peer network, similarly as described above with respect to 303 of FIG. 5. In 355, the first node may determine where the ID of the object falls in relation to the ordered IDs of the nodes, similarly as described above with respect to 305 of FIG. 5. In 357, the first node may select a second node based on where the ID of the object falls in relation to the ordered IDs of the nodes, similarly as described above with respect to 307 of FIG. 5. The second node may act as the directory server for the object.

In 359, the first node may send a message to the second node to request location information for the object.

In 361, the second node may return the location information for the object to the first node, where the location information specifies that the object is stored on a third node.

In 363, the first node may communicate with the third node to access the object. As used herein, accessing the object may include obtaining data from the object or obtaining data regarding the object. Accessing the object may also include writing data to the object or writing data regarding the object.

Fault Tolerance

In one embodiment, the methods described above may be modified to achieve greater fault tolerance by storing object location information for a given object on multiple nodes. In other words, multiple nodes 110 may act as directory servers for each object 136. For example, suppose that the mapping between objects and directory servers is performed as described above with reference to FIG. 5. That is, for each object, an $i^{th}$ node ID may be determined from a set of ordered node IDs such that the $i^{th}$ node ID is greater than the ID of the object and the $(i-1)^{th}$ node ID is less than the ID of the object.

In one embodiment, in addition to storing the location information for the object on the node having the $i^{th}$ node ID, location information for the object may also be stored on the nodes having the $(i+1)^{th}$ node ID, $(i+2)^{th}$ node ID, etc., up to the node having the $(i+R)^{th}$ node ID, where R is set to achieve the desired level of redundancy. Thus, if a first node later needs to access the object, the first node may first attempt to obtain the location information for the object from the node having the $i^{th}$ node ID. If the node having the $i^{th}$ node ID is not accessible, e.g., due to a network failure or other problem, then the first node may then attempt to obtain the location information for the object from the node having the $(i+1)^{th}$ node ID, etc., until the first node finds a working directory server for the object (or until all directory servers for the object have been tried unsuccessfully).

The level of redundancy may be configured as appropriate for a given system and may depend on considerations such as the total number of objects utilized in the system. If there is a very large number of objects, it may not be practical to store redundant object location information on a large number of nodes because of memory constraints on the nodes. Thus, the object location information for each object may be replicated on a relatively small number of nodes.

Navigating a Directory Hierarchy

As noted above, in various embodiments each object 136 may comprise various kinds of data, where the data may be organized in various ways. In one embodiment, a first object 136, also referred to herein as a directory object, may comprise directory information, where the directory information specifies location information for other objects 136. For example, a node may access the first object to obtain the directory information, e.g., by first looking up location information for the first object, similarly as described above. The node may then access a second object whose location information is specified by the directory information. The second object may be the object that the node ultimately needs to access, e.g., may be a file object, or the second object may also be a directory object, which specifies additional directory information. In the latter case, the node may access a third object whose location information is specified by the directory information of the second object. Thus, a node may navigate through a directory hierarchy in this manner by repeatedly utilizing location information stored by various objects.

Reducing Cost of Multiple Connections

As a node accesses multiple objects, the node may create multiple temporary connections with the directory servers for the respective objects. For some applications, it may be desirable to reduce the cost of creating and destroying these connections. Various techniques may be utilized to reduce this cost.

In one embodiment, User Datagram Protocol (UDP) messages may be utilized to accomplish the object location lookups. For some applications, UDP may be well suited for the lookup operations because the UDP request and reply messages are short, and a connection does not need to be established between the node performing the lookup and the directory server. To manage the unreliable nature of the UDP protocol, multiple requests and/or re-transmissions and timeouts may be utilized, as described below.

Because of the small cost of UDP-based lookup, a first node may send lookup requests to multiple directory servers responsible for a particular object simultaneously (where the object location information is replicated on multiple directory servers as described above). The first node may utilize the first location information that is received from any of the directory server nodes. In case no reply is received to any of the requests sent within a timeout, a UDP retry request may be sent a small number of times (e.g., 1-3 times). The timeout for retries may be calculated adaptively using exponential backoff. The time spent attempting re-transmissions may optionally be limited by a timeout $T_{max}$ for the entire lookup operation, which may be specified by a client application that initiates the lookup operation. Thus the client application may be guaranteed a positive or negative search response for the lookup operation within the $T_{max}$ interval.

The UDP-based lookup technique may be well-suited when the nodes in the peer-to-peer network are connected by a high bandwidth, well connected network such as a LAN, or a corporate site network. In particular, one system for which the UDP-based lookup technique may be well-suited is for an array of blade servers connected by a LAN.

In a high latency, WAN-like network, UDP messages may be considered too unreliable. In such a system, TCP connections may instead be used to provide reliable connections. A combination of directory server based search (for local lookups) and a tree layer based search (for remote lookups over the WAN) may be used in this case (where the tree layer search is performed by topology and routing layer software that maintains a tree-based view of the network).

In one embodiment, the peer-to-peer network may include multiple realms, e.g., where each realm includes nodes that are geographically close or otherwise well connected to each other. In one embodiment, a node that performs a lookup operation may first contact a directory server in its local realm. Location information for some objects may not be stored on the directory servers by default. If a node attempts to lookup location information for an object, and the location information for the object does not exist on the directory server(s), then the search may proceed along a tree that routes the search query to other realms. If the search is successful, then location information for the object may be stored on one or more directory servers in the local realm.

In one embodiment, nodes may publish the presence of certain objects to directory servers, where location information for the objects would not otherwise be stored on the directory server. This may be useful to populate the directory servers in advance with location information for the objects. Location information for objects may be published to directory servers in a local realm and/or remote realms.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a plurality of nodes, wherein the plurality of nodes includes:
   a third node, operable to select a second node of the plurality of nodes for storing location information for a data object stored on the third node, wherein the second node is configured to act as a directory server; and
   a first node operable to:
   determine the second node that stores the location information for the data object based on a mapping of the data object to the second node;
   send a message to the second node to request the location information for the data object;
   receive the location information for the data object from the second node, wherein the location information specifies that the data object is stored on the third node; and
   send a message to the third node in order to access the data object, wherein each node in the plurality of nodes has a node ID and the data object has an object ID, and wherein the third node selects the second node for storing the location information based on a deterministic relation that depends on the object ID irrespective of the node ID of the third node;
   wherein the first node determining the second node based on the mapping of the data object to the second node comprises:
   determining an ordering of the node ID's of the plurality of nodes; and
   determining that the object ID of the data object falls next to the node ID of the second node in relation to the ordered node ID's.

2. The system of claim 1, wherein said determining the second node based on the mapping of the data object to the second node comprises determining the second node based on a mapping of an object ID of the data object to the second node.

3. The system of claim 1, wherein, prior to the first node sending the message to the second node to request the location information for the data object, the third node is operable to:
   select the second node to store the location information for the data object-based on an object ID of the data object; and
   send a message to the second node to request the second node to store the location information for the data object.

4. The system of claim 1, wherein each node of the plurality of nodes has an associated node ID;
   wherein the first node determining the second node based on the mapping of the data object to the second node comprises the first node determining the second node based on an object ID of the data object and based on the node ID of the second node.

5. The system of claim 4, wherein said first node determining the second node based on the object ID of the data object and based on the node ID of the second node comprises the first node determining the second node based on a relationship between the object ID of the data object and the node ID of the second node.

6. The system of claim 4, wherein said first node determining the second node based on the object ID of the data object and based on the node ID of the second node comprises the first node determining that the object ID of the data object falls between the node ID of the second node and the node ID of another node.

7. The system of claim 1, wherein the data object comprises a file.

8. A non-transitory computer-readable memory medium storing program instructions executable to implement a method comprising:
   a third node of a plurality of nodes selecting a second node of the plurality of nodes for storing location information for a data object stored on the third node, wherein the second node is configured to act as a directory server;
   a first node of the plurality of nodes determining the second node that stores the location information for the data object based on a mapping of the data object to the second node;
   the first node sending a message to the second node to request the location information for the data object;
   the first node receiving the location information for the data object from the second node, wherein the location information specifies that the data object is stored on the third node: and
   the first node sending a message to the third node in order to access the data object, wherein each node in the plurality of nodes has a node ID and the data object has an object ID, and wherein the third node selects the second node for storing the location information based on a deterministic relation that depends on the object ID irrespective of the node ID of the third node;
   wherein the first node determining the second node based on the mapping of the data object to the second node comprises:
   determining an ordering of the node ID's of the plurality of nodes; and
   determining that the object ID of the data object falls next to the node ID of the second node in relation to the ordered node ID's.

9. The non-transitory computer-readable memory medium of claim 8, wherein said determining the second node based on the mapping of the data object to the second node comprises determining the second node based on a mapping of an object ID of the data object to the second node.

10. The non-transitory computer-readable memory medium of claim 8, wherein the method implemented by the program instructions further comprises:
    prior to the first node sending the message to the second node to request the location information for the data object, the third node selecting the second node to store the location information for the data object based on an object ID of the data object; and
    the third node sending a message to the second node to request the second node to store the location information for the data object.

11. The non-transitory computer-readable memory medium of claim 8, wherein the first node determining the second node based on the mapping of the data object to the second node comprises the first node determining the second node based on an object ID of the data object and based on a node ID of the second node.

12. The non-transitory computer-readable memory medium of claim 11, wherein said first node determining the second node based on the object ID of the data object and based on the node ID of the second node comprises the first node determining the second node based on a relationship between the object ID of the data object and the node ID of the second node.

13. The non-transitory computer-readable memory medium of claim 11, wherein said first node determining the second node based on the object ID of the data object and based on the node ID of the second node comprises the first node determining that the object ID of the data object falls between the node ID of the second node and the node ID of another node.

14. The non-transitory computer-readable memory medium of claim 8, wherein the data object comprises a file.

15. A system comprising:
a plurality of nodes, wherein each node includes a processor and memory, wherein each node has an associated node ID;
wherein the plurality of nodes includes a first node that stores a data object and selects a second node for storing location information for the data object, wherein the second node is configured to act as a directory server;
wherein the plurality of nodes includes the second node that stores the location information for the data object, wherein the location information specifies that the data object is stored on the first node;
wherein the plurality of nodes includes a third node operable to:
determine an object ID of the data object;
determine an ordering of the node ID's for the plurality of nodes;
determine where the object ID of the data object falls in relation to the ordered node ID's;
determine that the second node stores the location information for the data object based on where the object ID of the data object falls in relation to the ordered node ID's; and
send a message to the second node to request the location information for the data object, wherein the first node selects the second node for storing the location information based on a deterministic relation that depends on the object ID irrespective of the node ID of the first node.

16. The system of claim 15, wherein the third node is further operable to receive the location information and utilize the location information to access the data object.

17. The system of claim 16, wherein said utilizing the location information to access the data object comprises sending a message to the first node to access the data object.

18. The system of claim 15, wherein said determining that the second node stores the location information for the data object based on where the object ID of the data object falls in relation to the ordered node ID's comprises determining that the node ID of the second node is comparatively greater than the object ID of the data object and there is no other node with a node ID that is comparatively greater than the object ID of the data object and comparatively less than the node ID of the second node.

19. The system of claim 15, wherein said determining that the second node stores the location information for the data object based on where the object ID of the data object falls in relation to the ordered node ID's comprises determining that the node ID of the second node is comparatively less than the object ID of the data object and there is no other node with a node ID that is comparatively less than the object ID of the data object and comparatively greater than the node ID of the second node.

* * * * *